US008473710B2

(12) United States Patent
Scouller et al.

(10) Patent No.: US 8,473,710 B2
(45) Date of Patent: Jun. 25, 2013

(54) MULTIPLE PARTITIONED EMULATED ELECTRICALLY ERASABLE (EEE) MEMORY AND METHOD OF OPERATION

(75) Inventors: Ross S. Scouller, Austin, TX (US);
Frank K. Baker, Jr., Austin, TX (US);
Venkatagiri Chandrasekaran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 356 days.

(21) Appl. No.: 12/769,786

(22) Filed: Apr. 29, 2010

(65) Prior Publication Data

US 2011/0271034 A1    Nov. 3, 2011

(51) Int. Cl.
*G06F 12/02* (2006.01)

(52) U.S. Cl.
USPC ............... 711/173; 711/165; 711/E12.006

(58) Field of Classification Search
None
See application file for complete search history.

(56) References Cited

U.S. PATENT DOCUMENTS

| 6,904,400 | B1 | 6/2005 | Peri et al. |
| 7,058,755 | B2 | 6/2006 | Nallapa |
| 2003/0093711 | A1 | 5/2003 | Harari et al. |
| 2007/0014007 | A1 | 1/2007 | Miyatake et al. |
| 2007/0143528 | A1 | 6/2007 | Przybylek |

FOREIGN PATENT DOCUMENTS

EP    1237085 A1    9/2002

OTHER PUBLICATIONS

PCT Search Report PCT/US2011/031084 Dated Nov. 30, 2011 cited on U.S. Appl. No. 12/769,795—corresponding WO application).
U.S. Appl. No. 12/769,795, Inventor Ross S. Scouller, "Emulated Electrically Erasable (EEE) Memory and Method of Operation", Filed Apr. 29, 2010, Office Action—Rejection, mailed Apr. 23, 2012.
U.S. Appl. No. 12/769,795, Inventor Ross S. Scouller, "Emulated Electrically Erasable (EEE) Memory and Method of Operation", Filed Apr. 29, 2010, Office Action—Notice of Allowance, mailed Nov. 13, 2012.

*Primary Examiner* — Edward Dudek, Jr.
*Assistant Examiner* — Ryan Dare
(74) *Attorney, Agent, or Firm* — James L. Clingan, Jr.

(57) ABSTRACT

A method and system wherein a volatile memory is partitioned to have a first percentage of address space dedicated to a first classification of data which is data that is expected to have greater than a predetermined number of times of being modified and a second percentage of address space dedicated to a second classification of data which is data that is expected to have less than the predetermined probability of being modified. Address assignment of data to be stored in the volatile memory is made on a basis of predicted change of the data. Memory addresses of the first and second percentages of address space are respectively assigned to first and second sections of nonvolatile memory. The memory addresses of the first percentage initially consume a smaller percentage of an address map of the first section than the memory addresses of the second percentage of the second section.

20 Claims, 2 Drawing Sheets

MULTIPLE PARTITIONED EMULATED ELECTRICALLY ERASABLE (EEE) MEMORY AND METHOD OF OPERATION

CROSS-REFERENCE TO RELATED APPLICATION(S)

This application is related to U.S. patent application Ser. No. 12/769,795, filed on even date, entitled "EMULATED ELECTRICALLY ERASABLE (EEE) MEMORY AND METHOD OF OPERATION," naming Ross Scouller, Frank K. Baker, Jr., and Venkatagiri Chandrasekaran as inventors, and assigned to the current assignee hereof.

BACKGROUND

1. Field

This disclosure relates generally to memory systems, and more specifically, to method of operating an emulated electrically erasable (EEE) memory.

2. Related Art

Emulated electrically erasable (EEE) memories typically use a random access memory and a non-volatile memory that is electrically erasable combined to provide a memory system that has increased endurance over a regular non-volatile memory for a comparable size to that of the random access memory. This is achieved using a non-volatile memory much larger than the random access memory but EEE memory operates as if it were only the size of the random access memory. Thus the EEE memory emulates an electrically erasable memory of a reduced size from that which is used by the EEE memory but with an increase in endurance. This is useful in situations in which endurance is very important such as automotive applications in which data is updated often and must be stored in a non-volatile manner.

The cost of increased endurance is thus to increase the memory size of the non-volatile memory, which makes the device more expensive. Thus there is a continuing need to achieve effective endurance while avoiding further increasing costs due to increasing memory size.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect an emulated electrically erasable (EEE) memory has a RAM and a first and a second NVMs in which each NVM is divided into sectors. The RAM is divided into two portions that may be unequal so that the ratio of the records in the first portion to the amount of memory in the first NVM is significantly less than the ratio of the records in the second portion to the amount of memory in the second NVM. The records in the first portion are ones that will be changed, on average, significantly more often than those in the second portion. This greatly increases the endurance of the records of the first portion which is where the higher endurance is needed while not requiring an increase in the amount of memory. This is better understood by reference to the drawings and the following specification.

In one embodiment, a flash memory is used as the NVM. In one example, and as used herein, programming refers to storing a logic level zero to a bitcell and erasing refers to storing a logic level one to a bitcell. However, in alternate embodiments, programming may refer to storing a logic level one to a bitcell and erasing may refer to storing a logic level zero to a bitcell. A logic level zero may also be referred to as a logic low and a logic level one may also be referred to as a logic high.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, the plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
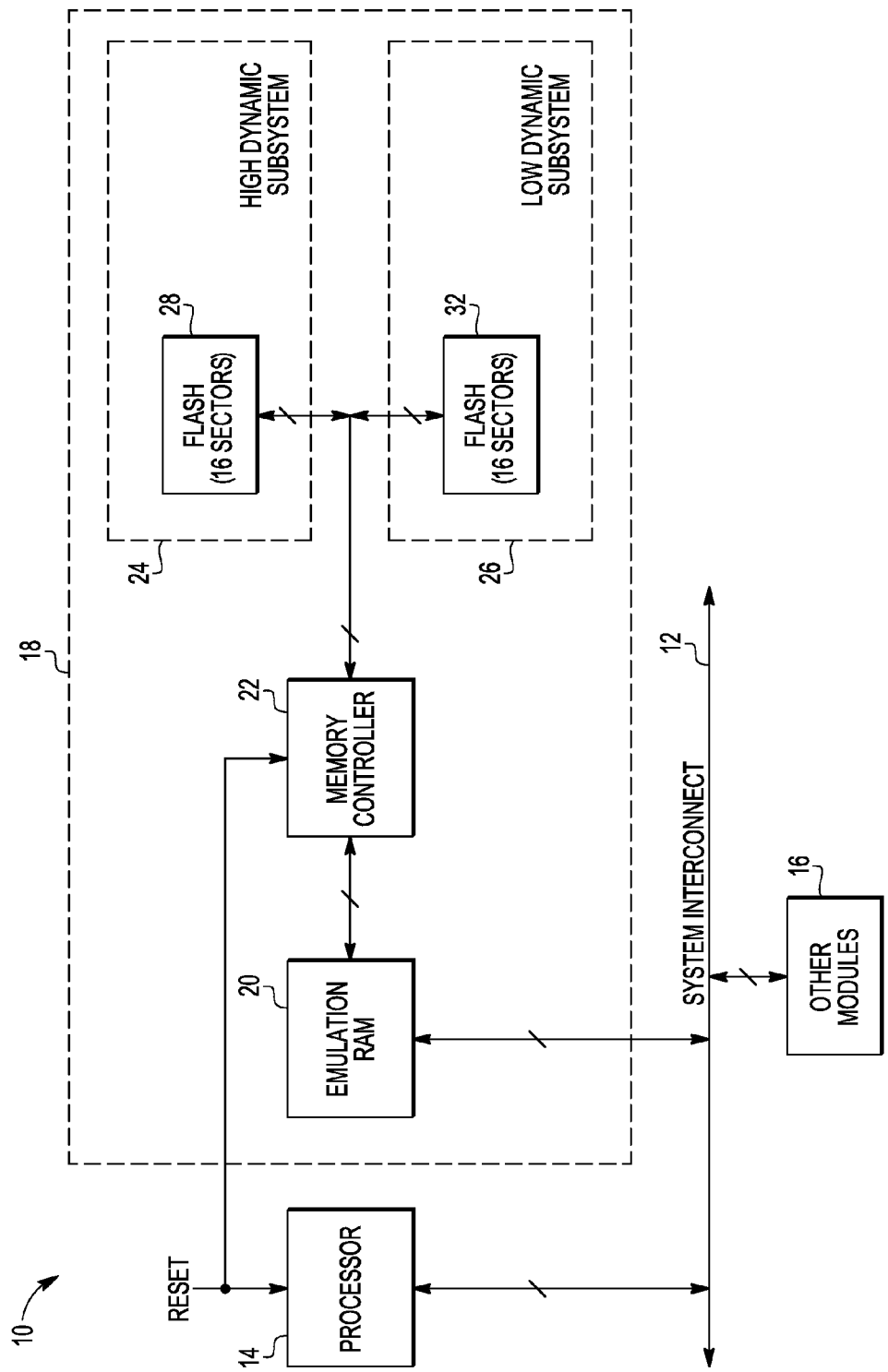
FIG. 1 illustrates in block diagram form a system, including a bifurcated emulated electrically erasable memory using a non-volatile memory, useful in implementing an embodiment of the present invention.

FIG. 1 illustrates, in block diagram form, a system 10 which includes a processor 14, other module(s) 16 (if any), a system interconnect 12, and an EEE memory system 18 (which may also be referred to as a memory system or a non-volatile memory system). Each of processor 14, other module(s) 16, and EEE memory system 18 are bidirectionally coupled to system interconnect 12. EEE memory system 18 includes a RAM 20, a memory controller 22, a flash partition 24, and a flash partition 26. Flash partition 24 comprises a flash memory 28. Flash partition 26 comprises a flash memory 32. Flash memories 28 and 32 may also be referred to as NVM arrays, where any type of NVM may be used in place of the flash memory. RAM 20 is bidirectionally coupled to system interconnect 12 and to memory controller 22. Memory controller 22 is coupled to flash memories 28 and 32 and controls the operation of flash memories 28 and 32. A reset signal is provided to processor 14 and memory controller 22. This reset signal may be, for example, a global reset signal for system 10.

Processor 14 can be any type of processor, such as a microprocessor, digital signal processor, etc., or may be any other type of interconnect master which can access EEE memory system 18. In one form, system interconnect 12 is a system bus. Other forms of interconnect may be used including, for example, crossbars, point-to-point connections, and optical and wireless transmission techniques. Other modules 16 may include any type of module, such as, for example, another memory, another processor, another interconnect master, a peripheral, an input/output (I/O) device, etc. Alternatively, no other modules may be present in system 10.

In operation, processor 14 can send access requests (read or write access requests) to memory system 18. The access requests from processor 14, which include an access address, and, in the case of a write access, associated write data, are provided to RAM 20. In the case of a read access, RAM 20 provides processor 14 the data stored at the received access address location. In the case of a write access, RAM 20 stores the received write data at the received access address location. In the case of a write access, memory controller 22 may detect an update of RAM 20 and selectively store the received access address and associated write data to flash memory 28 or flash memory 32 in a logically sequential manner. For example, in the case of an update (a write) to RAM 20, the received access address and associated write data are used to form a record that is written to flash memory 28 or 32 at the next available location. This next available location is logically sequential to a location that was loaded during an immediately preceding loading of flash array 28 or 32. (Note that, referring to FIG. 1, the received access address can be provided as an address to flash memory 28 or 32 and the associated write data as data in to flash memory 28 or 32.) In one example, the writing of the record corresponding to the RAM update is only performed if the value that is currently stored at the RAM location is different from the new write value associated with the write access request for that RAM location. In this manner, flash memory 28 or 32 can store the values of RAM 20 which have been updated in a more permanent manner. This above described operation is why RAM 20 is shown as an emulation RAM. When RAM 20 loses power, its data is lost. Upon restoring power, the values of the RAM may be restored from flash memory 28 or 32, which do not lose their data upon losing power. Flash memories 28 and 32 have a greater storage capacity than RAM 20.

RAM 20 is divided into two portions. In the described example, RAM 20 has the capacity for storing 2048 records in which a first portion of the two portions has 256 records and a second portion has the remaining 1792 records. RAM 20 can be partitioned into more than two portions and can be partitioned differently than 256 and 1792 even when there are just two partitions. The first portion is stored in flash memory 28, and the second portion is stored in flash memory 32. The first portion of records are selected on the basis that they are the ones who are expected to have the highest rate of change, and these records may be called high dynamic records. The second portion of records are selected as the ones that are expected to have a lower rate of change and may be called low dynamic records. In operation, when RAM 20 is to read or write a record, memory controller 22 responds by performing the corresponding operation on flash memory 28 if the record is in the address range for high dynamic records and flash memory 32 if the record is in the address range for a low dynamic record. It may be beneficial to memory controller 22 to include a bit field in the data for identifying the record as being high dynamic or low dynamic. The partitioning of RAM 20 and the corresponding configuring of memory controller 22 may be achieved by an instruction received through system interconnect 12. The processor decodes the instruction, which may be considered a signal, and provides RAM 20 and memory controller 22 with corresponding settings. The described operation of RAM 20 and memory controller 22 may be achieved with present hardware settings or with hardware with limited options. Also the operation of memory controller 22 may be achieved through software instructions and corresponding operation of processor 14.

In this example, each flash memory 28 and 32 has 16 sectors in which each sector has the capacity for storing 256 records. A benefit of flash is its low cost which is due to being high density. A disadvantage of flash, which arises from the high density architecture, is that erasing is not available on a bit basis or even a record basis. A record may be 16 bits in this example. In this description, a sector is the considered the smallest unit of flash memory that can be erased with a single erase. Thus, initially, flash memory 28, in order to store the initial state of all 256 of the high dynamic records, will fill one sector. Flash memory 32, in order to store the initial state of all 1792 of the low dynamic records, will fill seven sectors.

Figure 2:
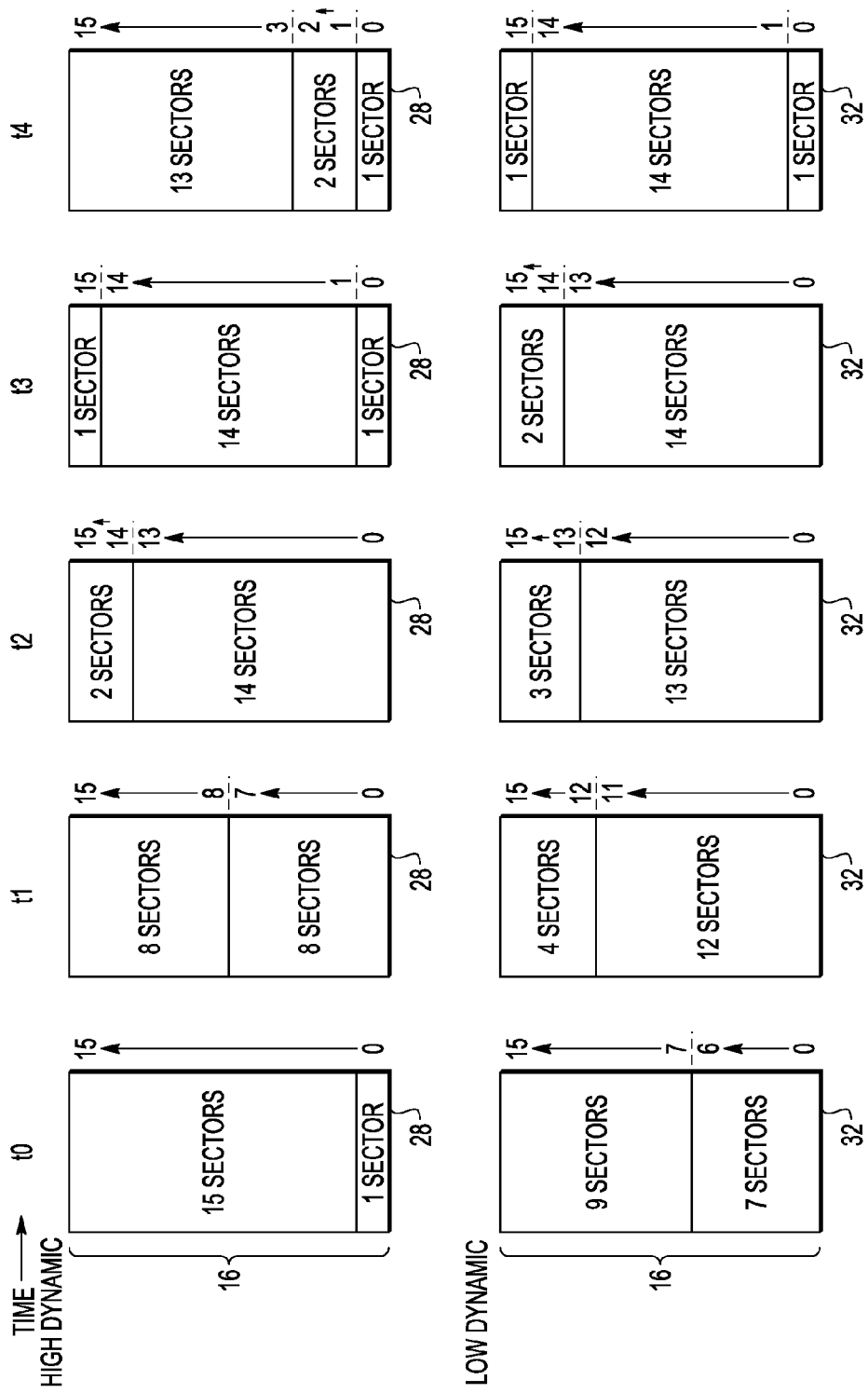
FIG. 2 illustrates, in block diagram form, the non-volatile memory of FIG. 1 shown in progressive states.

Shown in FIG. 2 is a progression of the contents of flash memories 28 and 32 from a time t0 to a time t4. Time t0 is the initial condition in which sector 0 of flash memory 28 is filled with high dynamic records and the seven sectors 0-6 of flash memory 32 are filled with low dynamic records. In this initial condition, sectors 1-15 of flash memory 28 will be in the erased condition and ready to be written and nine sectors, sectors 7-15 of flash memory 32, will be in the erased condition and ready to be written. As operations proceed, RAM 20 will be written and corresponding updates to flash memories 28 and 32 will occur. At a time t1, 7 additional sectors, sectors 1-7 representing 1792 records, have been updated in flash memory 28 and 5 additional sectors, sectors 7-11 representing 1280 records, have been updated in memory 32. Although it is unlikely to occur very often, assume in this case that at time t1, that for memory 28 sector 7 has been completely written and no updating has begun in sector 8 and similarly for memory 32 that sector 11 has been completely written and no updating has occurred in sector 12. In such case, the average number of changes for a record for the high dynamic records is 1792 divided by 256 which equals 7 whereas the average number of changes for the low dynamic records was 1280 divided by 1792 which equals about 0.71. In this example the ratio of the average updates of the high dynamic records to the low dynamic records was 7 divided by 0.71 which is about 9.8.

At a subsequent time t2, an additional 6 sectors of flash memory 28 have been updated and only one additional sector has been updated in memory 32. This shows that the update rates can vary from one time period to another. For the case of memory 28, there are only two sectors, sectors 14 and 15, that are still available for updating records. In such case, as records begin being written in the next sector, sector 14, it is beneficial to begin preparing for erasing the sector to be written after sector 15 is written which is sector 0. In preparation for this, sector 0 is scanned for any valid records that still remain. The valid records in sector 0 are then written into the current sector being written, sector 14 or perhaps sector 15. After all of the valid records in sector 0 have been safely stored outside of sector 14, sector 0 is erased which is shown at time t3. At time t3, the updated records in memory 28 are in 14 sectors, sectors 1-14. Sectors 0 and 15 are available for updating. At time t3, memory 32 is similar to the condition of memory 28 at time t2 in which sectors 0-13 are updated and sectors 14 and 15 are available for new updating. In this example of the change from time t2 to time t3 there was one sector updated for each of flash memories 28 and 32.

At time t4, memory 28 has sectors 3-15 and sector 0 updated and sectors 2 and 3 available for updating, and memory 32 has sectors 1-14 updated and sectors 0 and 15 available for updating. As for memory 28 in the transition from time t2 to time t3, memory controller 22 identifies the valid records in sector 0 of memory 32 and rewrites them in sector 14 or 15 then erases sector 0. The transition from t3 and t4 again shows that only one sector was written in each of flash memories 38 and 32.

That the same number of records is being updated in each of memories 28 and 32 for a given time period is a desirable result. The average update per high dynamic record for updating one sector is 256 records in a sector divided by 256 total high dynamic records is 1. For the low dynamic records the average per record for one sector change is 256 records divided by 1792 low dynamic records which equals 1 divided by 7, or 1/7. Thus in order to obtain the same rate of updates for memories 28 and 32, the average rate of change for the high dynamic records must be 7 times that for the low dynamic records. The actual comparative change rates may be something that can be accurately determined in advance by a user who will use system 10 in a larger system. After the determining the different change rates for the records, a set of high dynamic records and a set of low dynamic records can be established that achieve the desirable average ratio or the memory allocation can be done differently with a different memory architecture. For example, each sector could be considered a memory and instead of each of memories 28 and 32 having the same number of sectors, one could have more sectors than the other. Another possibility is that some records must have a particularly high endurance, some a lower, and some may not be critical in that failures may be tolerated. In such case there could be three categories with the three memories in which one was for high dynamic records, one for low dynamic records, and a third for non-critical records.

Additionally, there may be variations in when preparations for erasing sectors begins. As described, there would be a sector being written, a sector erased, and another sector being prepared for being erased and then erased. As an alternative it may be necessary to provide more margin by updating one sector and while the next two are still erased, prepare a third sector for erasing and perform the erase. Other erasing schemes may also be used.

In the described example, there were just two partitions but more may be used. As the number of arrays increase in which the EEE system is implemented, the number of EEE partitions would increase enabling shorter search times, better endurance and ease of implementation. As the number of subsystems increase the more levels of dynamic data can be obtained. For instance in a four partition system three could be allocated to a high dynamic and one to a low dynamic system or each system could be for a different dynamic level. The non-volatile memory (NVM) for this application is generally a flash memory which is very space efficient. Part of the reason for the space efficiency is that individual NVM cells are not erased individually but, due to the NVM design itself, as part of a group of NVM cells such as a subarray. NVM cells in a given sector are erased together and sectors may thus correspond to subarrays. Alternatively, a sector could be made up of more than one subarray in which the system is operated such that all of the subarrays in the sector are erased together even though that may not be required by the NVM itself. Also from the perspective of the NVM design, the NVM could be one large memory that is partitioned as desired or multiple memories in which each is a partition. Also a partition could be in more than one NVM.

By now it should be appreciated that there has been provided a method that allows for doing a portion of the data transfer or a portion of the write process for each update cycle as needed to ensure that there is sufficient space available to perform updates without having to do a large data transfer and complete erase process at all at once causing a large delay when that occurs.

Described is method that includes partitioning a volatile memory to have a first percentage of address space within the volatile memory dedicated to high dynamic data which is data that is expected to have greater than a predetermined number of times of being modified and a second percentage of address space within the volatile memory which is dedicated to low dynamic data which is data that is expected to have less than the predetermined number of times of being modified, thereby allocating address assignment of data to be stored in the volatile memory on a basis of predicted change of the data. The method further includes assigning memory addresses of the first percentage of address space to a first portion of nonvolatile memory. The method further includes assigning memory addresses of the second percentage of address space to a second portion of nonvolatile memory, the memory addresses of the first percentage of address space initially consuming a smaller percentage of an address map of the first portion of nonvolatile memory than the memory addresses of the second percentage of address consumes in an address map of the second portion of nonvolatile memory. The method may further comprise receiving a signal at an input of a data processor as a software instruction that is input for execution by the data processor and performing the partitioning in response thereto. The method may further comprise receiving a signal as a command that invokes use of stored information in a memory controller and performing the partitioning in response thereto. The method may further comprise coupling a memory controller between a processor, volatile memory, and the first and second portions of nonvolatile memory and separately performing a number of memory program and erase operations that is within twenty percent of each other on the first portion of the nonvolatile memory and the second portion of the nonvolatile memory over a predetermined period of time. The method may further comprise implementing the first portion of nonvolatile memory and the second portion of nonvolatile memory as substantially same sized memories. The method may further comprise dedicating at least seventy percent of storage of the volatile memory to low dynamic data. The method may further comprise partitioning the volatile memory to have additional assigned address space for segregating data stored in the volatile memory to regions additional to the regions dedicated to high dynamic data and low dynamic data. The method may further comprise storing high dynamic data from the volatile memory in a redundant form in the first portion of nonvolatile memory and storing low dynamic data from the volatile memory in a redundant form in the second portion of nonvolatile memory The method may further comprise.

Also described is a memory system that includes a processor comprising an input for receiving a signal and decoding the signal. The memory system further includes a volatile memory coupled to the processor via a system interconnect, the volatile memory being partitioned to have a first percentage of address space within the volatile memory dedicated to high dynamic data which is data that is expected to have greater than a predetermined number of times of being modified and a second percentage of address space within the volatile memory dedicated to low dynamic data which is data that is expected to have less than a predetermined probability of being modified, thereby allocating address assignment of data to be stored in the volatile memory on a basis of predicted change of the data. The memory system further includes a memory controller coupled to the volatile memory and the processor. The memory system further includes a first nonvolatile memory portion coupled to the memory controller, memory addresses of the first percentage of address space being assigned to the first nonvolatile memory portion. The memory system further includes a second nonvolatile memory portion coupled to the memory controller, memory addresses of the second percentage of address space being assigned to the second nonvolatile memory portion, the memory addresses of the first percentage of address space initially consuming a smaller percentage of an address map of the first nonvolatile memory portion than the memory addresses of the second percentage of address consumes in an address map of the second nonvolatile memory portion. The memory system may have a further characterization by which the signal is received as a software instruction that is input for execution by the processor and partitioning is performed in response thereto. The memory system may have a further characterization by which the signal is received as a command that invokes use of stored information in the memory controller and partitioning is performed in response thereto. The memory system may have a further characterization by which within twenty percent of a same number of memory program and erase operations are performed on the first nonvolatile memory portion and the second nonvolatile memory portion over a predetermined period of time. The memory system may have a further characterization by which the first nonvolatile memory portion and the second nonvolatile memory portion are substantially same sized memories. The memory system may have a further characterization by which at least seventy percent of storage of the volatile memory is dedicated to low dynamic data. The memory system may have a further characterization by which the volatile memory is partitioned to have additional assigned address space for segregating data stored in the volatile memory to regions additional to the regions dedicated to high dynamic data and low dynamic data. The memory system may have a further characterization by which high dynamic data from the volatile memory is stored in a redundant form in the first nonvolatile memory portion and low dynamic data from the volatile memory is stored in a redundant form in the second nonvolatile memory portion.

Described also is a method that includes partitioning a volatile memory to have a first percentage of address space within the volatile memory dedicated to a first classification of data which is data that is expected to have greater than a predetermined number of times of being modified and a second percentage of address space within the volatile memory dedicated to a second classification of data which is data that is expected to have less than the predetermined probability of being modified, thereby allocating address assignment of data to be stored in the volatile memory on a basis of predicted change of the data. The method further includes assigning memory addresses of the first percentage of address space to a first section of a nonvolatile memory having a first predetermined number of sectors. The method further includes assigning memory addresses of the second percentage of address space to a second section of the nonvolatile memory having a second predetermined number of sectors, the memory addresses of the first percentage of address space initially consuming a smaller percentage of an address map of the first section of nonvolatile memory than the memory addresses of the second percentage of address consumes in an address map of the second section of the nonvolatile memory. The method may further comprise implementing within twenty percent of a same number of sectors in the first section of nonvolatile memory as the second section of nonvolatile memory. The method may further include storing the first classification of data from the volatile memory in a redundant form in the first section of the nonvolatile memory and storing the second classification of data from the volatile memory in a redundant form in the second section of the nonvolatile memory. The method may further include receiving a signal that is used to determine at least one of the first percentage and the second percentage.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Also for example, in one embodiment, the illustrated elements of system 10 are circuitry located on a single integrated circuit or within a same device. Alternatively, system 10 may include any number of separate integrated circuits or separate devices interconnected with each other. For example, EEE memory system 18 may be located on a same integrated circuit as processor 14 or on a separate integrated circuit. Memory system 18 may be an embedded memory system or a stand alone memory system. Other module(s) 16 may also be located on separate integrated circuits or devices.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, particular memory sizes, sector sizes, and record sizes were described as an example but other sizes may be used. Also the number of partitions in the described example was two, but there could be four or even more. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:
1. A method comprising:
  partitioning a volatile memory to have a first percentage of address space within the volatile memory dedicated to high dynamic data which is data that is expected to have greater than a predetermined number of times of being modified and a second percentage of address space within the volatile memory which is dedicated to low dynamic data which is data that is expected to have less than the predetermined number of times of being modi- fied, thereby allocating address assignment of data to be stored in the volatile memory on a basis of predicted change of the data;

assigning memory addresses of the first percentage of address space to a first portion of nonvolatile memory; and assigning memory addresses of the second percentage of address space to a second portion of nonvolatile memory, the memory addresses of the first percentage of address space initially consuming a smaller percentage of an address map of the first portion of nonvolatile memory than the memory addresses of the second percentage of address consumes in an address map of the second portion of nonvolatile memory.

2. The method of claim 1 further comprising:
receiving a signal at an input of a data processor as a software instruction that is input for execution by the data processor and performing the partitioning in response thereto.

3. The method of claim 1 further comprising:
receiving a signal as a command that invokes use of stored information in a memory controller and performing the partitioning in response thereto.

4. The method of claim 1 further comprising:
coupling a memory controller between a processor, volatile memory, and the first and second portions of nonvolatile memory; and
separately performing a number of memory program and erase operations that is within twenty percent of each other on the first portion of the nonvolatile memory and the second portion of the nonvolatile memory over a predetermined period of time.

5. The method of claim 1 further comprising:
implementing the first portion of nonvolatile memory and the second portion of nonvolatile memory as substantially same sized memories.

6. The method of claim 1 further comprising:
dedicating at least seventy percent of storage of the volatile memory to low dynamic data.

7. The method of claim 1 further comprising:
partitioning the volatile memory to have additional assigned address space for segregating data stored in the volatile memory to regions additional to the regions dedicated to high dynamic data and low dynamic data.

8. The method of claim 1 further comprising:
storing high dynamic data from the volatile memory in a redundant form in the first portion of nonvolatile memory; and
storing low dynamic data from the volatile memory in a redundant form in the second portion of nonvolatile memory.

9. A memory system comprising:
a processor comprising an input for receiving a signal and decoding the signal;
a volatile memory coupled to the processor via a system interconnect, the volatile memory being partitioned to have a first percentage of address space within the volatile memory dedicated to high dynamic data which is data that is expected to have greater than a predetermined number of times of being modified and a second percentage of address space within the volatile memory dedicated to low dynamic data which is data that is expected to have less than a predetermined probability of being modified, thereby allocating address assignment of data to be stored in the volatile memory on a basis of predicted change of the data;

a memory controller coupled to the volatile memory and the processor;
a first nonvolatile memory portion coupled to the memory controller, memory addresses of the first percentage of address space being assigned to the first nonvolatile memory portion; and
a second nonvolatile memory portion coupled to the memory controller, memory addresses of the second percentage of address space being assigned to the second nonvolatile memory portion, the memory addresses of the first percentage of address space initially consuming a smaller percentage of an address map of the first nonvolatile memory portion than the memory addresses of the second percentage of address consumes in an address map of the second nonvolatile memory portion.

10. The memory system of claim 9 wherein the signal is received as a software instruction that is input for execution by the processor and partitioning is performed in response thereto.

11. The memory system of claim 9 wherein the signal is received as a command that invokes use of stored information in the memory controller and partitioning is performed in response thereto.

12. The memory system of claim 9 wherein within twenty percent of a same number of memory program and erase operations are performed on the first nonvolatile memory portion and the second nonvolatile memory portion over a predetermined period of time.

13. The memory system of claim 9 wherein the first nonvolatile memory portion and the second nonvolatile memory portion are substantially same sized memories.

14. The memory system of claim 9 wherein at least seventy percent of storage of the volatile memory is dedicated to low dynamic data.

15. The memory system of claim 9 wherein the volatile memory is partitioned to have additional assigned address space for segregating data stored in the volatile memory to regions additional to the regions dedicated to high dynamic data and low dynamic data.

16. The memory system of claim 9 wherein high dynamic data from the volatile memory is stored in a redundant form in the first nonvolatile memory portion and low dynamic data from the volatile memory is stored in a redundant form in the second nonvolatile memory portion.

17. A method comprising:
partitioning a volatile memory to have a first percentage of address space within the volatile memory dedicated to a first classification of data which is data that is expected to have greater than a predetermined number of times of being modified and a second percentage of address space within the volatile memory dedicated to a second classification of data which is data that is expected to have less than the predetermined probability of being modified, thereby allocating address assignment of data to be stored in the volatile memory on a basis of predicted change of the data;

assigning memory addresses of the first percentage of address space to a first section of a nonvolatile memory having a first predetermined number of sectors; and assigning memory addresses of the second percentage of address space to a second section of the nonvolatile memory having a second predetermined number of sectors, the memory addresses of the first percentage of address space initially consuming a smaller percentage of an address map of the first section of nonvolatile memory than the memory addresses of the second percentage of address consumes in an address map of the second section of the nonvolatile memory.

18. The method of claim 17 further comprising:

implementing within twenty percent of a same number of sectors in the first section of nonvolatile memory as the second section of nonvolatile memory.

19. The method of claim 17 further comprising:

storing the first classification of data from the volatile memory in a redundant form in the first section of the nonvolatile memory; and storing the second classification of data from the volatile memory in a redundant form in the second section of the nonvolatile memory.

20. The method of claim 17 further comprising:

receiving a signal that is used to determine at least one of the first percentage and the second percentage.

* * * * *